(12) United States Patent
Spencer

(10) Patent No.: US 11,426,021 B2
(45) Date of Patent: Aug. 30, 2022

(54) APPARATUS FOR SIMPLIFYING REMOVAL OF ONION SKIN

(71) Applicant: Philip A Spencer, NT (HK)

(72) Inventor: Philip A Spencer, NT (HK)

(*) Notice: Subject to any disclaimer, the term of this patent is extended or adjusted under 35 U.S.C. 154(b) by 0 days.

(21) Appl. No.: 17/272,658

(22) PCT Filed: Mar. 24, 2020

(86) PCT No.: PCT/IB2020/052730
§ 371 (c)(1),
(2) Date: Mar. 2, 2021

(87) PCT Pub. No.: WO2020/194174
PCT Pub. Date: Oct. 1, 2020

(65) Prior Publication Data
US 2021/0345810 A1    Nov. 11, 2021

(30) Foreign Application Priority Data
Mar. 26, 2019  (HK) .................................. 19121511.0

(51) Int. Cl.
*A47J 17/02*    (2006.01)
(52) U.S. Cl.
CPC .................................... *A47J 17/02* (2013.01)

(58) Field of Classification Search
CPC ............ A23N 15/08; A23N 7/02; A47J 17/02
See application file for complete search history.

(56) References Cited

U.S. PATENT DOCUMENTS

| 3,060,838 | A | * | 10/1962 | Priore | .................... | A21C 15/04 |
| | | | | | | 99/DIG. 15 |
| 4,545,297 | A | * | 10/1985 | Ihlow | ..................... | A47J 17/00 |
| | | | | | | 99/591 |
| D521,819 | S | * | 5/2006 | So | ................................. | D7/673 |
| 9,060,637 | B2 | * | 6/2015 | Knezevic | ................ | A47J 17/18 |

* cited by examiner

Primary Examiner — Stephen Choi

(57) ABSTRACT

Provided is an apparatus which simplifies the removal of an onion skin comprising a skin contacting side (1), a cutting and spreading element (2), and a lifting member (31, 32). After the cutting tip (22) of the cutting and spreading element (2) cuts into the outermost onion layer(s) at a top end of the onion and slides downwards along an outer contour of the onion towards a bottom end of the onion to create a cut along the contour of the onion, the lower lifting edge (312, 322) of the lifting member (31, 32) slots behind an inner edge of the cut outermost onion layer(s) and the lifting member (31, 32) lifts up portions of the onion layer(s) in contact therewith as it slides downwards until it passes through the bottom end of the onion, thereby allowing a user to split apart the lifted portions along the cut to remove the outermost onion layer(s) together with outer hard skin of the entire onion in one go.

10 Claims, 4 Drawing Sheets

APPARATUS FOR SIMPLIFYING REMOVAL OF ONION SKIN

BACKGROUND OF THE INVENTION

The present invention relates to a kitchen hand tool and more particularly pertains to an apparatus that simplifies removal of onion skin.

Onion peeling devices are commonly available in the prior art, examples of which include devices as disclosed in U.S. Pat. Nos. 4,545,297 and 9,060,637 B2.

U.S. Pat. No. 4,545,297 discloses an onion peeling device with a rest comprising mutually spring-tensioned pivot arms circularly arranged on a support plate with a clearance", and each of the pivot arms includes a head providing a slitting knife located in the plane of rotation and a stripper means extending approximately tangentially to the onion cross-section. To peel an onion, the onion is positioned on the rest; as the heads of the pivot arms impinge on the onion, the slitting knives enter the outer onion skin which they then slit, and upon further depression, the stripper means catches/grabs hold of and takes off the slit skins. After the onion is peeled, the slit skins can jam at the bottom of the rest making them difficult to remove and clean the rest. Besides, during the peeling process the slit skins may also jam the device, making it difficult to complete the peeling process.

U.S. Pat. No. 9,060,637 B2 discloses an onion peeling device which also comprises a first part for holding an onion, and at least one second part comprising a frame on which the first and/or second arms are arranged around an opening. At least two of the first arms are provided with cutting means and at least two of the second arms are provided with peeling means. The peeling means has the shape of one or several hooks and is adapted to intrude into the onion surface and grip at least the outer layer of the onion. When the second part is pressed down over an onion, the outer layer of the onion is caught and the tangential force from the arms separates and pries apart the layers; thus the hard skin and the outermost soft layer are torn off the onion by the peeling means. Again, after the onion is peeled, the torn off hard skin and the outermost soft layer of the onion may jam on the first part, making it difficult to remove and reuse or clean the apparatus.

Besides, both onion peeling devices mentioned are complex in structure.

BRIEF SUMMARY OF THE INVENTION

In view of the aforesaid disadvantages now present in the prior art, the present invention provides an apparatus which simplifies the removal of onion skin. The present invention is capable of helping to remove onion skin in a clean manner, thus increasing the rate at which onions can be peeled and simplifying the clean-up process required when using conventional onion peelers.

To attain this, the present invention comprises a skin contacting side and a cutting and spreading element extending downwards from a top end of the skin contacting side. The cutting and spreading element tapers downwardly from an upper wide portion to a bottom end to form a cutting tip located on a first vertical plane. The cutting tip is configured to create a cut along a contour on the onion as the cutting tip cuts into outermost onion layer(s) at a top end of the onion and slides downwards from the top end of the onion towards a bottom end of the onion. The upper wide portion of the cutting and spreading element is configured to enlarge the cut's width for facilitating user to spread the cut outermost onion layer(s) laterally from the cut with enlarged width and remove the outermost onion layer(s) with outer hard skin of the entire onion in one go.

The present invention further comprises a lifting member which extends outwards from the skin contacting side above the cutting and spreading element. The lifting member is wedge-shaped and projects downwards from an upper thick edge ending with a lower lifting edge. The lifting member has an inner end which is proximal to the skin contacting side and an outer end opposite to the inner end. The lower lifting edge at the inner end is located on a second vertical plane which is at a first distance forward from the first vertical plane, and the lower lifting edge at the inner end is at a horizontal level which is at a second distance upward from the cutting tip. The lower lifting edge is configured to slot behind an inner edge of the cut outermost onion layer(s) after the cutting tip cuts into the outermost onion layer(s) to lift up portions of the onion layer(s) in contact with the cut outermost onion layer(s) as it slides downwards until it passes through the bottom end of the onion, thereby allowing the user to split apart the lifted portions along the cut to remove the outermost onion layer(s) together with outer hard skin of the entire onion in one go.

In one embodiment, the lifting member extends leftwards or rightwards from the skin contacting side; the lower lifting edge of the lifting member comprises an extended portion and a recessed portion; the recessed portion is provided at the inner end of the lower lifting edge in such a manner to allow the extended portion of the lower lifting edge to lie horizontally outwards of the cutting and spreading element.

In one embodiment, the lifting member comprises a left lifting member and a right lifting member; the left lifting member extends leftwards from the skin contacting side; the right lifting member extends rightwards from the skin contacting side; the lower lifting edge of each of the left lifting member and the right lifting member comprises an extended portion and a recessed portion; the recessed portion is provided at the inner end of the lower lifting edge in such a manner to allow the extended portion of the lower lifting edge to lie horizontally outwards of the cutting and spreading element.

In one embodiment, the lifting member is arcuate in shape with the outer end thereof located on a third vertical plane which is at a third distance forward from the second vertical plane.

In one embodiment, the first distance, the second distance and the third distance are each less than 1 cm. The skin contacting side is arcuate in shape.

In one embodiment, it further comprises a handle portion which overlies the skin contacting side.

In one embodiment, the skin contacting side is attached to an upper end of an arm which is flexible and arcuate in shape to form a cutting and spreading arm; a bottom end of the cutting and spreading arm is attached to a frame with an opening at center; the upper end of the cutting and spreading arm points towards a center axis of the opening; the frame cooperates with an onion holding base which holds the onion in such a way that as the frame is pressed down over the base, the upper end of the cutting and spreading arm is guided towards the top end of the onion so that the cutting tip cuts into outermost onion layer(s) at the top end of the onion and slides downwards from the top end of the onion towards the bottom end of the onion.

In one embodiment, a thumb rest is provided on an upper portion of the cutting and spreading arm for the user to guide the upper end of the cutting and spreading arm towards the top end of the onion prior to downward movement of the frame in relation to the base and to guide the cutting tip of the cutting and spreading arm to create a cut along the contour of the onion as the frame is pressed down over the base.

In one embodiment, more than one cutting and spreading arms are attached to the frame in an equally spaced manner, with the upper ends of the cutting and spreading arms pointing towards the center axis of the opening.

In one embodiment, a first guiding shaft is provided at an outer periphery of the base, and a first guiding shaft sleeve is correspondingly provided at an outer periphery of the frame; the first guiding shaft is configured to pass through the first guiding shaft sleeve when the frame is pressed down over the base so as to guide the movement of the frame in relation to the base.

In one embodiment, a second guiding shaft is provided at the outer periphery of the base opposite to the first guiding shaft, and a second guiding shaft sleeve is correspondingly provided at the outer periphery of the frame.

In one embodiment, a first grip and a second grip opposite to each other are provided on the frame.

In one embodiment, a raised platform in shape of a conical frustum is provided at the base; at least one protruding pin onto which the onion is placed is provided on an upper surface of the raised platform; recesses corresponding in shape and size to the cutting and spreading arms are provided on side surface of the raised platform for supporting the cutting and spreading arms when the frame is pressed down over the base.

DETAILED DESCRIPTION OF THE INVENTION

Figure 1:
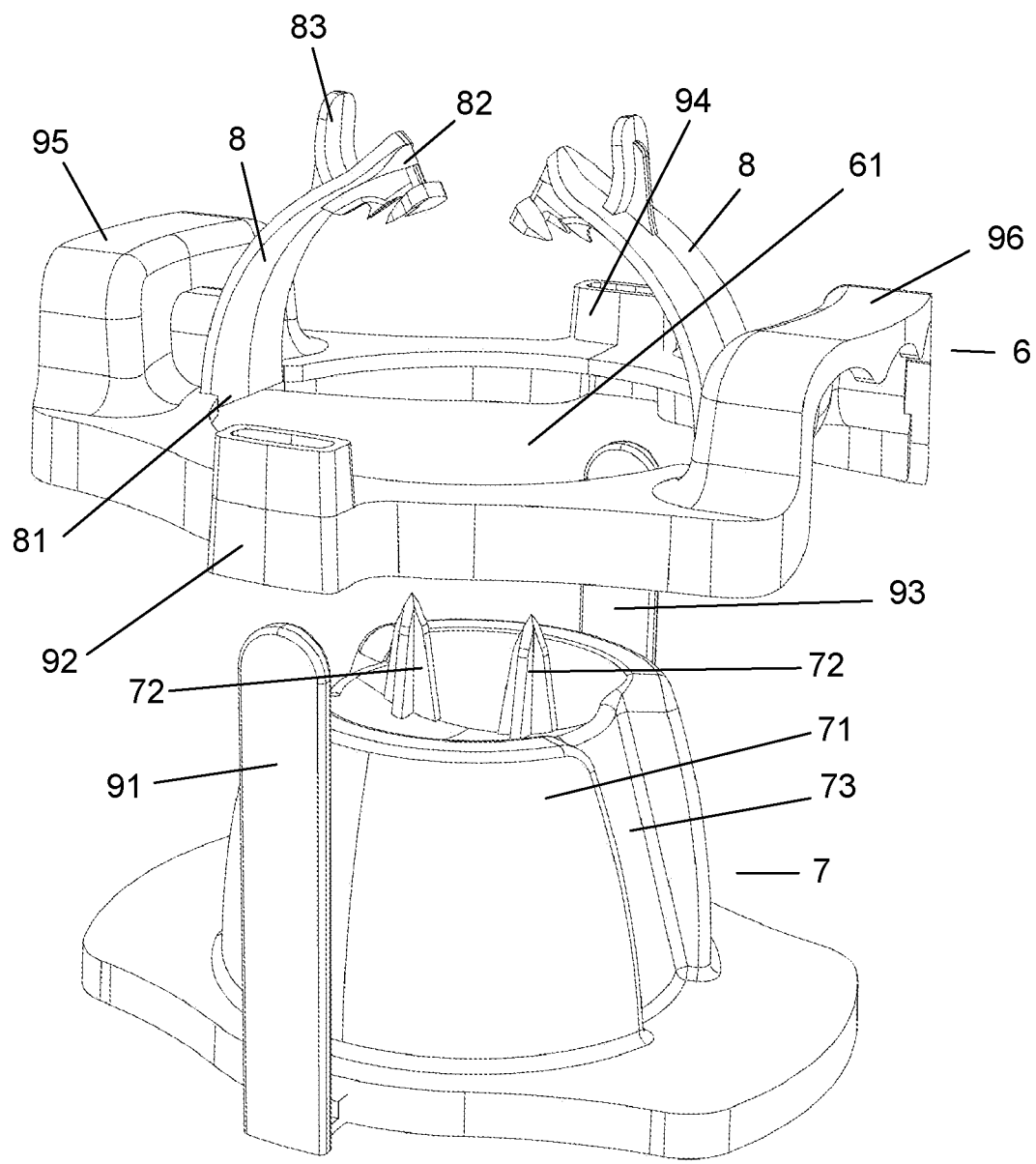
FIG. 1 shows a perspective view of an embodiment of the present invention with the frame detached from the base.
Figure 2:
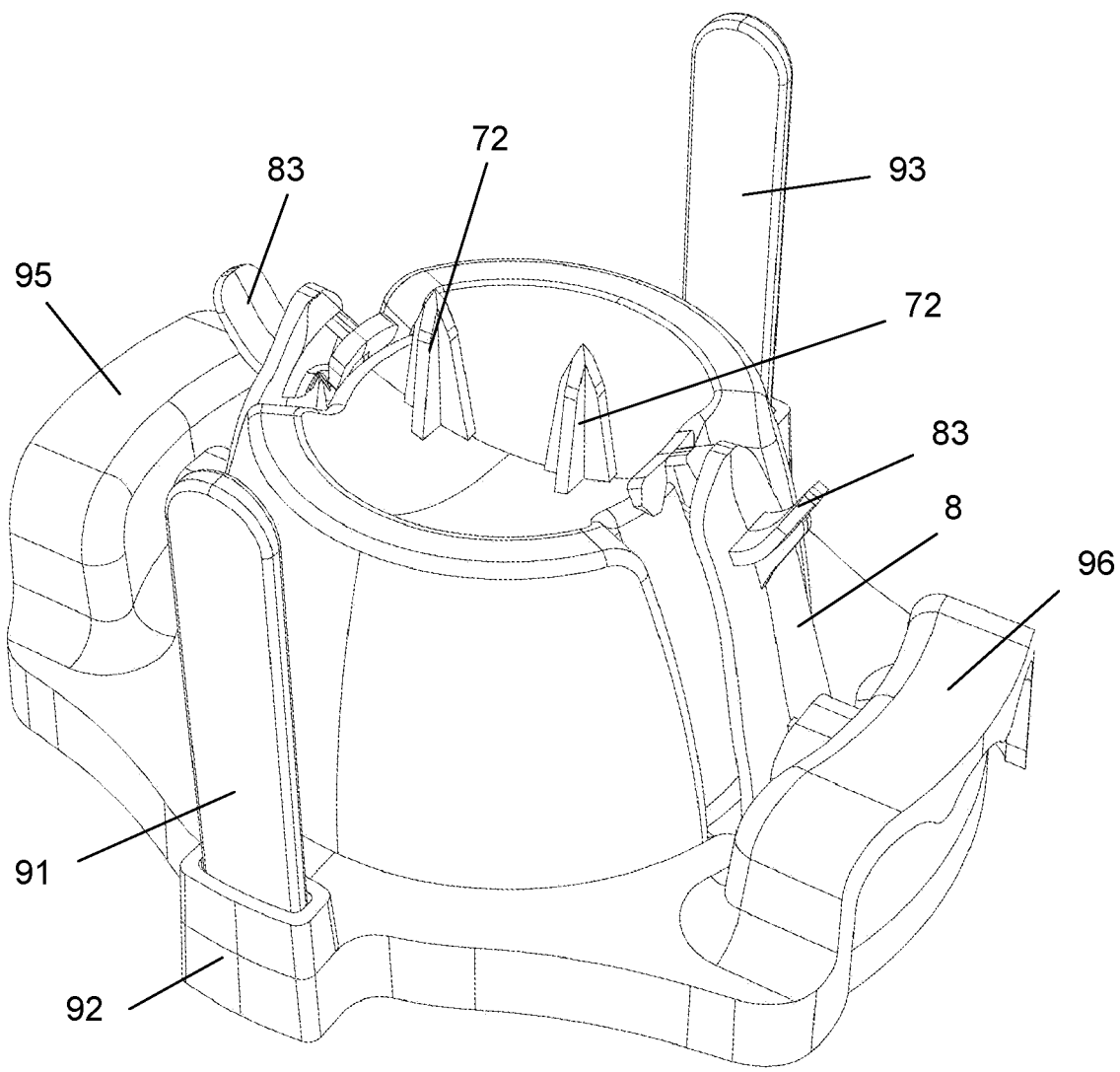
FIG. 2 shows a perspective view of the embodiment of the present invention as shown in FIG. 1 with the frame pressed down over to the base.
Figure 3:
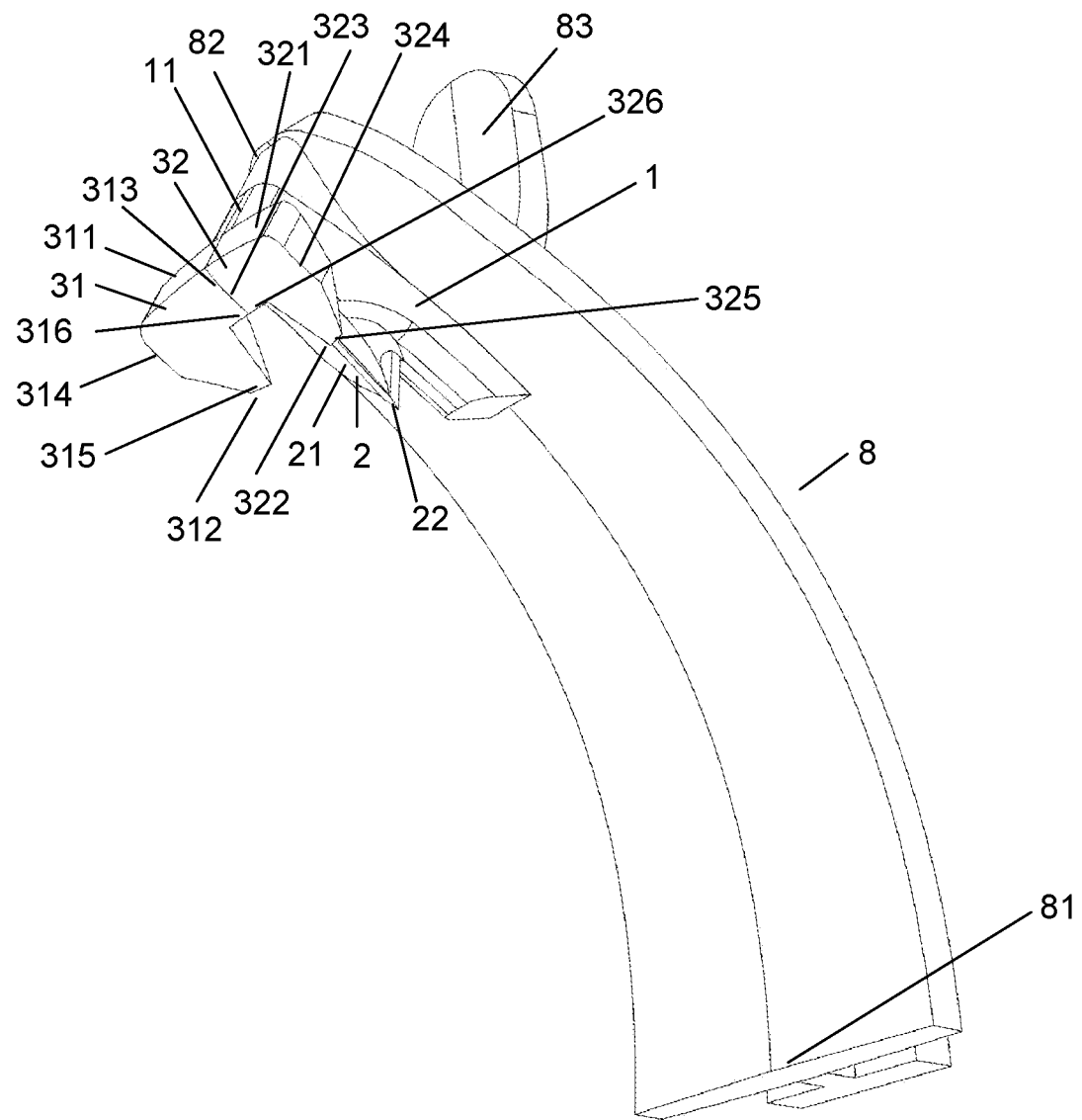
FIG. 3 shows perspective view of the cutting and spreading arm of the embodiment as shown in FIG. 1.
Figure 4:
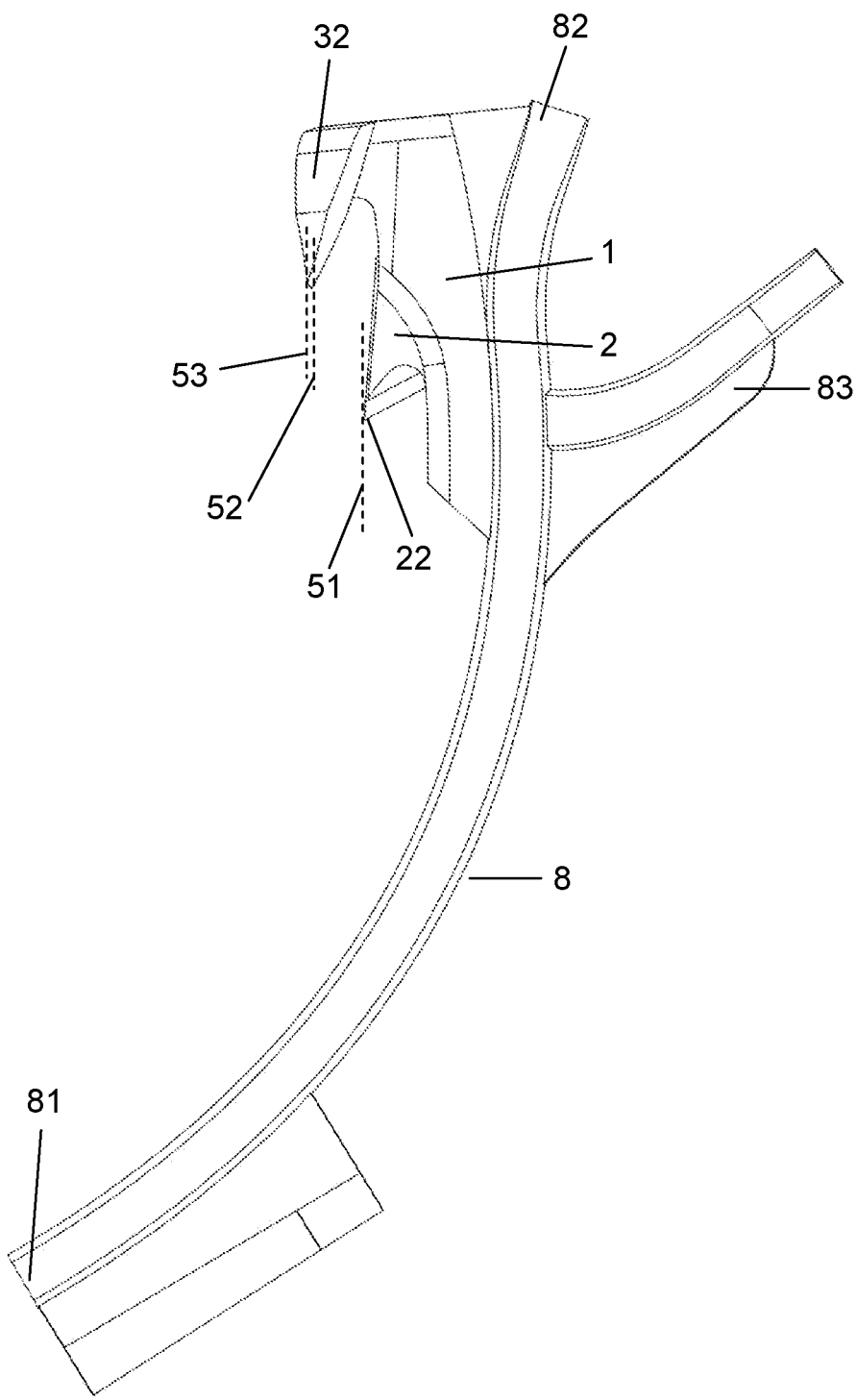
FIG. 4 shows a side view of the cutting and spreading arm as shown in FIG. 3, rotated for a certain degree for ease of illustration.

FIGS. 1 to 4 illustrate an embodiment of the present invention which comprises a frame 6 with an opening 61 at center, and an onion holding base 7 which holds an onion with its top and bottom removed. The bottom ends 81 of a pair of cutting and spreading arms 8 are attached to opposite sides of the frame 6. The upper end 82 of each of the cutting and spreading arms 8 is attached to a skin contacting side 1 of an apparatus which simplifies removal of onion skin. The apparatus which simplifies removal of onion skin comprises, in addition to the skin contacting side 1, a cutting and spreading element 2 having a cutting tip 22, a left lifting member 31 and a right lifting member 32. The upper ends 82 of the cutting and spreading arms 8 point towards a center axis of the opening 61 of the frame 6.

The skin contacting side 1 is arcuate in shape to coincide with the outer contour of an average onion. The cutting and spreading element 2 extends downwards from a top end 11 of the skin contacting side 1. The cutting and spreading element 2 tapers downwardly from an upper wide portion 21 to a bottom end to form a cutting tip 22 located on a first vertical plane 51. In this embodiment, the maximum width of the upper wide portion 21 is 4*mm*. Each of the left lifting member 31 and the right lifting member 32 extends outwards from the skin contacting side 1 above the cutting and spreading element 2, with the left lifting member 31 extending leftwards from the skin contacting side 1 and the right lifting member 32 extending rightwards from the skin contacting side 1. Each of the left lifting member 31 and the right lifting members 32 is wedge-shaped and projects downwards from an upper thick edge 311, 321 ending with a lower lifting edge 312, 322. Each of the left lifting member 31 and the right lifting member 32 has an inner end 313, 323 which is proximal to the skin contacting side 1 and an outer end 314, 324 opposite to the inner end 313, 323. The lower lifting edges 312, 322 at the inner ends 313, 323 are located on a second vertical plane 52 which is at a first distance which is preferably less than 1 cm (0.5 cm in this embodiment) forward from the first vertical plane 51, and are at a horizontal level which is at a second distance which is preferably less than 1 cm (0.5 cm in this embodiment) upward from the cutting tip 22. The lower lifting edges 312, 322 of each of the left lifting member 31 and the right lifting member 32 comprises an extended portion 315, 325 and a recessed portion 316, 326. The recessed portions 315, 325 are respectively provided at the inner ends 313, 323 of the lower lifting edges 312, 322 in such a manner to allow the extended portions 315, 325 of the lower lifting edges 312, 322 to lie horizontally outwards of the cutting and spreading element 2. Each of the left lifting member 31 and the right lifting member 32 is arcuate in shape with the outer end 314, 324 thereof located on a third vertical plane 53 which is at a third distance which is preferably less than 1 cm (0.2 cm in this embodiment) forward from the second vertical plane 52.

To remove the skin of an onion, the user first removes the top and bottom of the onion, so that the onion has a substantially flat top end and bottom end. The user then fixes the onion on the onion holding base 7. During operation, the frame 6 cooperates with the base 7 in such a way that as the frame 6 is pressed down over the base 7, the upper ends 82 of the cutting and spreading arms 8 are guided towards the top end of the onion so that the cutting tips 22 cut into the outermost onion layer(s) inward of the outer hard skin at the top end of the onion, and then slide downwards from the top end along the outer contour of the onion towards the bottom end of the onion. A thumb rest 83 is provided on an upper portion of each of the cutting and spreading arms 8 for the user to guide the upper end 82 of the cutting and spreading arm 8 towards the top end of the onion prior to the downward movement of the frame 6 in relation to the base 7 so that the cutting tips 22 cut into the outermost onion layer(s) at the top end of the onion, and to guide the cutting tips 22 to create a cut along the contour of the onion as the frame 6 is pressed down over the base 7. As each of the cutting tips 22 slide downwards, the upper wide portion 21 of the cutting and spreading element 2 enlarges the cut's width, and the lower lifting edges 312, 322 slot behind an inner edge of the cut outermost onion layer(s) of the onion at the top end of the onion, and the left and right lifting members 31, 32 lift up portions of the onion layer(s) in contact therewith as they slide downwards until they pass through the bottom end of the onion. The tapering structure from top to bottom facilitates the left and right lifting members 31, 32 to pass through the onion from the top end to the bottom end. The first distance between the first vertical plane 51 and the second vertical plane 52, together with the space formed by the recessed portions 316, 326 of the lower lifting edges 312, 322 prevent the outer hard skin and the lifted onion portions from jamming the apparatus during operation. The user could then split apart the lifted portions along the cut to remove the outermost onion layer(s) together with outer hard skin of the entire onion in one go.

In this embodiment, a first guiding shaft 91 is provided at an outer periphery of the base 7 at a position between the two cutting and spreading arms 8, and a first guiding shaft sleeve 92 is correspondingly provided at an outer periphery of the frame 6. The first guiding shaft 91 is configured to pass through the first guiding shaft sleeve 92 when the frame 6 is pressed down over the base 7 so as to guide the movement of the frame 6 in relation to the base 7. A second guiding shaft 93 is provided at the outer periphery of the base 7 opposite to the first guiding shaft 91, and a second guiding shaft sleeve 94 is correspondingly provided at the outer periphery of the frame 6. A first grip 95 and a second grip 96 are provided on the frame 6 outward of the two cutting and spreading arms 8 respectively for the user to place their hands when the frame 6 is pressed down over the base 7. A raised platform 71 in shape of a conical frustum is provided at the base 7. Two protruding pins 72 onto which the onion is placed are provided on an upper surface of the raised platform 71. Two recesses 73 corresponding in shape and size to the two cutting and spreading arms 8 are provided on side surface of the raised platform 71 for supporting the two cutting and spreading arms 8 when the frame 6 is pressed down over the base 7.

In an alternative embodiment not illustrated in the drawings, the left lifting member or the right lifting member of the above embodiment may be omitted.

In a further alternative embodiment not illustrated in the drawings, the apparatus which simplifies removal of onion skin comprises a handle portion which overlies the skin contacting side and form a standalone handy apparatus without cutting and spreading arms, the frame and the base in the above illustrated embodiment.

The above embodiments are preferred embodiments of the present invention. The present invention is capable of other embodiments and is not limited by the above embodiments. Any other variation, decoration, substitution, combination or simplification, whether in substance or in principle, not deviated from the spirit of the present invention, is replacement or substitution of equivalent effect and falls within the scope of protection of the present invention.

What is claimed is:

1. An apparatus which simplifies removal of onion skin from an onion with its top and bottom removed, comprising:
    a skin contacting side;
    a cutting and spreading element extending downwards from a top end of the skin contacting side;
    the cutting and spreading element tapers downwardly from an upper wide portion to a bottom end to form a cutting tip located on a first vertical plane;
    the cutting tip is configured to create a cut along a contour on the onion as the cutting tip cuts into outermost onion layer(s) at a top end of the onion and slides downwards from the top end of the onion towards a bottom end of the onion;
    the upper wide portion of the cutting and spreading element is configured to enlarge the cut's width for facilitating user to spread the cut outermost onion layer(s) laterally from the cut with enlarged width and remove the outermost onion layer(s) with outer hard skin of the entire onion in one go
    the apparatus further comprises a lifting member which extends outwards from the skin contacting side above the cutting and spreading element; the lifting member is wedge-shaped and projects downwards from an upper thick edge ending with a lower lifting edge; the lifting member has an inner end which is proximal to the skin contacting side and an outer end opposite to the inner end; the lower lifting edge at the inner end is located on a second vertical plane which is at a first distance forward from the first vertical plane, and the lower lifting edge at the inner end is at a horizontal level which is at a second distance upward from the cutting tip; the lower lifting edge is configured to slot behind an inner edge of the cut outermost onion layer(s) after the cutting tip cuts into the outermost onion layer(s) to lift up portions of the onion layer(s) in contact with the cut outermost onion layer(s) as it slides downwards until it passes through the bottom end of the onion, thereby allowing the user to split apart the lifted portions along the cut to remove the outermost onion layer(s) together with outer hard skin of the entire onion in one go.

2. The apparatus as in claim 1, wherein the lifting member extends leftwards or rightwards from the skin contacting side; the lower lifting edge of the lifting member comprises an extended portion and a recessed portion; the recessed portion is provided at the inner end of the lower lifting edge in such a manner to allow the extended portion of the lower lifting edge to lie horizontally outwards of the cutting and spreading element.

3. The apparatus as in claim 1, wherein the lifting member comprises a left lifting member and a right lifting member; the left lifting member extends leftwards from the skin contacting side; the right lifting member extends rightwards from the skin contacting side; the lower lifting edge of each of the left lifting member and the right lifting member comprises an extended portion and a recessed portion; the recessed portion is provided at the inner end of the lower lifting edge in such a manner to allow the extended portion of the lower lifting edge to lie horizontally outwards of the cutting and spreading element.

4. The apparatus as in claim 2 or claim 3, wherein the lifting member is arcuate in shape with the outer end thereof located on a third vertical plane which is at a third distance forward from the second vertical plane.

5. The apparatus as in claim 2 or claim 3, wherein the skin contacting side is arcuate in shape.

6. The apparatus as in claim 1, wherein it further comprises a handle portion which overlies the skin contacting side.

7. The apparatus as in any one of claims 1, 2 and 3, wherein the skin contacting side is attached to an upper end of an arm which is flexible and arcuate in shape to form a cutting and spreading arm; a bottom end of the cutting and spreading arm is attached to a frame with an opening at center; the upper end of the cutting and spreading arm points towards a center axis of the opening; the frame cooperates with an onion holding base which holds the onion in such a way that as the frame is pressed down over the base, the upper end of the cutting and spreading arm is guided towards the top end of the onion so that the cutting tip cuts into outermost onion layer(s) at the top end of the onion and slides downwards from the top end of the onion towards the bottom end of the onion.

8. The apparatus as in claim 7, wherein a thumb rest is provided on an upper portion of the cutting and spreading arm for the user to guide the upper end of the cutting and spreading arm towards the top end of the onion prior to downward movement of the frame in relation to the base and to guide the cutting tip of the cutting and spreading arm to create a cut along the contour of the onion as the frame is pressed down over the base.

9. The apparatus as in claim 8, wherein more than one cutting and spreading arms are attached to the frame in an equally spaced manner, with the upper ends of the cutting and spreading arms pointing towards the center axis of the opening.

10. The apparatus as in claim 9, wherein a first guiding shaft is provided at an outer periphery of the base, and a first guiding shaft sleeve is correspondingly provided at an outer periphery of the frame; the first guiding shaft is configured to pass through the first guiding shaft sleeve when the frame is pressed down over the base so as to guide the movement of the frame in relation to the base.

* * * * *